US008963024B2

(12) United States Patent
Hudlet et al.

(10) Patent No.: US 8,963,024 B2
(45) Date of Patent: Feb. 24, 2015

(54) SENSOR PASS THROUGH ASSEMBLY

(75) Inventors: Steven Douglas Hudlet, Hayden, ID (US); Rex Reum, Spokane, WA (US)

(73) Assignee: Jetseal, Inc., Spokane, WA (US)

( * ) Notice: Subject to any disclaimer, the term of this patent is extended or adjusted under 35 U.S.C. 154(b) by 865 days.

(21) Appl. No.: 13/042,720

(22) Filed: Mar. 8, 2011

(65) Prior Publication Data

US 2011/0247876 A1 Oct. 13, 2011

Related U.S. Application Data

(63) Continuation-in-part of application No. 11/945,802, filed on Nov. 27, 2007, now Pat. No. 7,939,769.

(60) Provisional application No. 60/867,358, filed on Nov. 27, 2006.

(51) Int. Cl.

| | |
|---|---|
| ***H02G 3/18*** | (2006.01) |
| ***H01R 13/502*** | (2006.01) |
| ***H01R 13/52*** | (2006.01) |

(52) U.S. Cl.

CPC .................................. *H01R 13/5208* (2013.01)

USPC ........................... 174/650; 174/560; 29/592.1

(58) Field of Classification Search

CPC ........... H01M 2/06; H01M 2/30; H01M 2/08; H01B 17/303; H01B 17/30; H01B 17/305; H02G 3/22; H02G 3/088; H02G 15/013

USPC .................................................. 174/650, 560

See application file for complete search history.

(56) References Cited

U.S. PATENT DOCUMENTS

| | | | | |
|---|---|---|---|---|
| 2,276,969 A * | 3/1942 | Heinichen | ..................... | 277/606 |
| 3,779,585 A | 12/1973 | Handzlik | | |
| 4,154,302 A * | 5/1979 | Cugini | .......................... | 166/378 |
| 4,267,401 A * | 5/1981 | Wilkinson | .................. | 174/77 R |
| 4,544,169 A | 10/1985 | Cobb et al. | | |
| 4,688,809 A | 8/1987 | Deppe | | |
| 5,235,138 A * | 8/1993 | Shah et al. | .................... | 174/151 |
| 5,365,971 A | 11/1994 | Bergamini | | |
| 5,551,709 A | 9/1996 | Plunkett | | |
| 5,669,263 A * | 9/1997 | Borchers et al. | ............ | 73/304 R |
| 5,709,475 A | 1/1998 | Stoor | | |
| 5,906,634 A * | 5/1999 | Flynn et al. | ..................... | 607/37 |
| 6,453,551 B1 | 9/2002 | Nordquist et al. | | |
| 6,545,583 B1 | 4/2003 | Palmer | | |
| 6,575,473 B2 | 6/2003 | Sugimoto et al. | | |
| 6,742,395 B1 | 6/2004 | Borgers et al. | | |
| 6,875,926 B2 * | 4/2005 | Buekers et al. | ............... | 174/100 |
| 6,918,617 B2 | 7/2005 | Nordquist et al. | | |

(Continued)

FOREIGN PATENT DOCUMENTS

WO 02/103293 12/2002

*Primary Examiner* — William H Mayo, III
*Assistant Examiner* — Rhadames J Alonzo Miller
(74) *Attorney, Agent, or Firm* — Fish & Tsang LLP

(57) ABSTRACT

Contemplated device, assembly and methods include a sensor feed through assembly that protects and seals a set of wires. The assembly has a body, a first seal, a second seal and a cover. The wires thread through a first opening on the body through a second opening of the first seal and exit orthogonally between the first seal and the second seal. The cover tightens the entire assembly and secures the wires between the two seals. The entire unit can be coupled to other pressurized vessels under different temperatures and pressurized environments.

11 Claims, 6 Drawing Sheets

(56) References Cited

U.S. PATENT DOCUMENTS

| | | | | |
|---|---|---|---|---|
| 6,927,338 | B2 | 8/2005 | Shimola et al. | |
| 6,986,516 | B2 | 1/2006 | Inamura et al. | |
| 6,997,463 | B2 | 2/2006 | Udagawa et al. | |
| 7,239,238 | B2 | 7/2007 | Tester et al. | |
| 7,487,830 | B2 * | 2/2009 | Wolters et al. | 166/242.6 |
| 7,581,976 | B2 * | 9/2009 | Liepold et al. | 439/282 |
| 7,763,808 | B2 | 7/2010 | Tolbert, Jr. | |
| 2004/0159444 | A1 * | 8/2004 | Wolters et al. | 166/381 |
| 2004/0182590 | A1 | 9/2004 | Nordquist et al. | |
| 2012/0049871 | A1 * | 3/2012 | Raj | 324/722 |
| 2013/0167975 | A1 * | 7/2013 | Tigges | 141/285 |

* cited by examiner

SENSOR PASS THROUGH ASSEMBLY

This application is a continuation of U.S. patent application Ser. No. 11/945,802 filed Nov. 27, 2007, which claims priority to U.S. provisional application Ser. No, 60/867,358 filed Nov. 27, 2006, which are incorporated herein by reference in its entirety.

FIELD OF THE INVENTION

The field of the invention is a feed-through device for sealing various sensor wires and tubes.

BACKGROUND

Seals and gaskets have long been used to seal wires, pipes, tubes, and other conduits to prevent leakage between compartments in a device. An airtight seal is especially important in situations where the conduit connects two environments of drastically different pressures or temperatures. A leak, even a small one, could compromise not only the integrity of the conduit, but also the integrity of the entire device. However, problems exist where wires can be easily damaged exiting extreme temperatures and pressurized environments. When multiple wires are involved, they are difficult to organize and dangle in dangerous conditions.

Sealing units such as the one shown in U.S. Pat. No. 4,544,169 to Cobb et al. teach a gasket seal for a metallic wire that is sealed by sandwiching the wire between two metallic sheets, and tightening that seal with multiple bolts. The multiple bolt design is resistant to both high pressure and high temperature differentials. The metallic sheets in Cobb; however, cannot seal multiple wires of various diameters simultaneously. Additionally, since the wire in Cobb deforms the metallic sheets by forming indents, if the wire needs to be repaired or changed, the entire assembly needs to be replaced.

Conventional pass-throughs attempt to solve the problem by creating a housing that allows the wires to pass through safely. For example, U.S. Pat. No. 6,453,551 to Nordquist teaches sealing a wire by wrapping it in an elastic seal that is compressed before the wire is plugged into a hole. Unfortunately, such a seal can easily loosen and break, particularly when a pressure differential exists. U.S. Pat. No. 6,918,617 to Nordquist also tries to address the problem by soldering gaps around the wire; however, this makes the set-up difficult to disassemble and reassemble during routine maintenance.

Thus, there is still a need for an improved pressure and temperature resistant seal that can accommodate a plurality of wires and allows for quick and easy wire maintenance without replacing the entire assembly.

This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

SUMMARY OF THE INVENTION

The inventor has discovered that a feed through assembly can be configured in a simple and effective manner in which known problems associated with pressurized compartments are substantially eliminated. Contemplated devices and methods will provide substantially improved sealing and "easy to install" feed through assembly.

The present invention provides apparatus, systems and methods in which a wire feed through assembly seals a plurality of wires exiting through a high pressurized environment. The assembly has various components including a body, a first seal, and a second seal. Sensors, such as wires, pitot tubes and thermal couples, thread through a first opening on a body then through a second opening on the first seal and exit orthogonally between the first seal and the second seal. The unit is then tightened with a second seal and a cover using bolts and like tighteners to ensure an airtight sealing environment. In preferred embodiments, the body has a set of grooves in which the wires can thread through for more organization. The wires can also exit laterally or parallely from the assembly.

The body of the assembly can be cylindrical, wedge-shaped, rectangular, planar, or any other suitable shape, and can be coupled to a variety of devices. Some examples are, a pipe, a flange, a pipe adapter, a pressure vessel or even a vacuum vessel. Retaining rings could be used to help fasten or couple the body to the device.

The first opening is preferably cylindrical to accommodate a pipe, but can be any suitable shape to accommodate a device that couples with the first opening. An exemplary first opening is shaped to accommodate at least one wire, preferably at least fifty and more preferably at least two hundred wires, and has a 1.5" National Pipe Thread ("NPT") inlet. While the first opening is preferably at least 1.5" to accommodate a variety of wires of various sizes the first opening can be less than ¼" depending on the need.

The first seal and second seal can be made of any suitable material that is both soft and resilient. Some examples are flexible graphite, silicone rubber, natural rubber, man-made rubber, and resilient plastic. Both seals are preferably made of the same material to form an airtight seal around the wires, and multiple seals and covers could be used to seal the plurality of wires in multiple locations. Whether using one cover and seal or multiple covers and seals, the set of wires are preferably secured in unison.

The set of grooves can be formed anywhere on the body, but are preferably disposed next to the first opening or are parallel to the first opening. The grooves can be a mere indentation or recess to guide the wires, or can be shaped into a series of hooks to hold the wires in place before the cover is secured. While the grooves can be shaped in any suitable manner, the grooves are preferably slots to allow for easy placement and replacement of wires threaded through the grooves.

Depending on the placement and orientation of the grooves, the wires can be threaded in various manners. Some examples are orthogonally, laterally, or parallely. Preferably, the grooves are evenly distributed around a perimeter of the body, and can accommodate more than one wire. If the first opening receives a pipe, at least one slot preferably has a groove floor perpendicular to a cross-section of the pipe, so that the wire does not bend as the wire threads through the slot.

The cover secures the wires with one or more tighteners. The tightener can be received in at least one hole in the body, or another device that receives the tightener can be coupled to the body. A preferred device is a nut plate with an opening and a set of grooves to receive and hold the wires in place along a side of the body. While a single cover can secure the wires between the first seal and the second seal when the cover engages the body, additional covers coupled to the second seal can provide a particularly robust seal.

The tightener is preferably a bolt to withstand both high pressures and high temperatures, but can also be a latch, a wing nut, a clip or any other suitable device. To adequately secure the wires between the cover and the seal, the cover preferably has a plurality of tighteners that are arranged around a perimeter of the tightening cover. An especially preferred cover disengages the second seal without displacing the wires.

The contemplated assembly can accommodate a variety of wires. Some for examples are sensor wires, pitco tubes, thermo couples, pressure tubing, or even data wires. When built with the preferred embodiments, the entire assembly can withstand a pressure of at least 500 PSI, and at least a temperature of 850° F. with extreme low leak rate.

DETAILED DESCRIPTION

Figure 1:
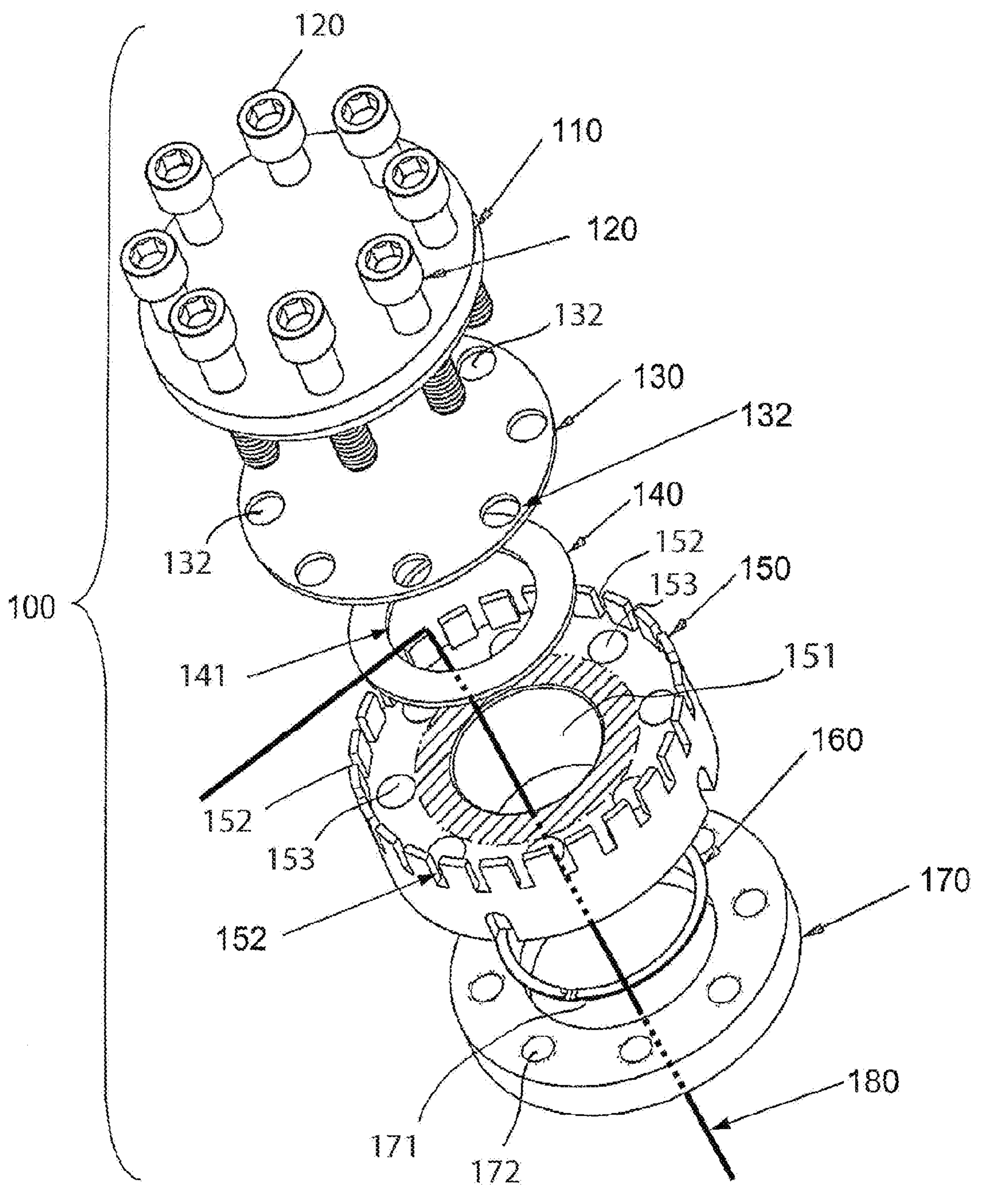
FIG. 1 is an exploded view of a sensor feed through assembly according to one embodiment.
Figure 3:
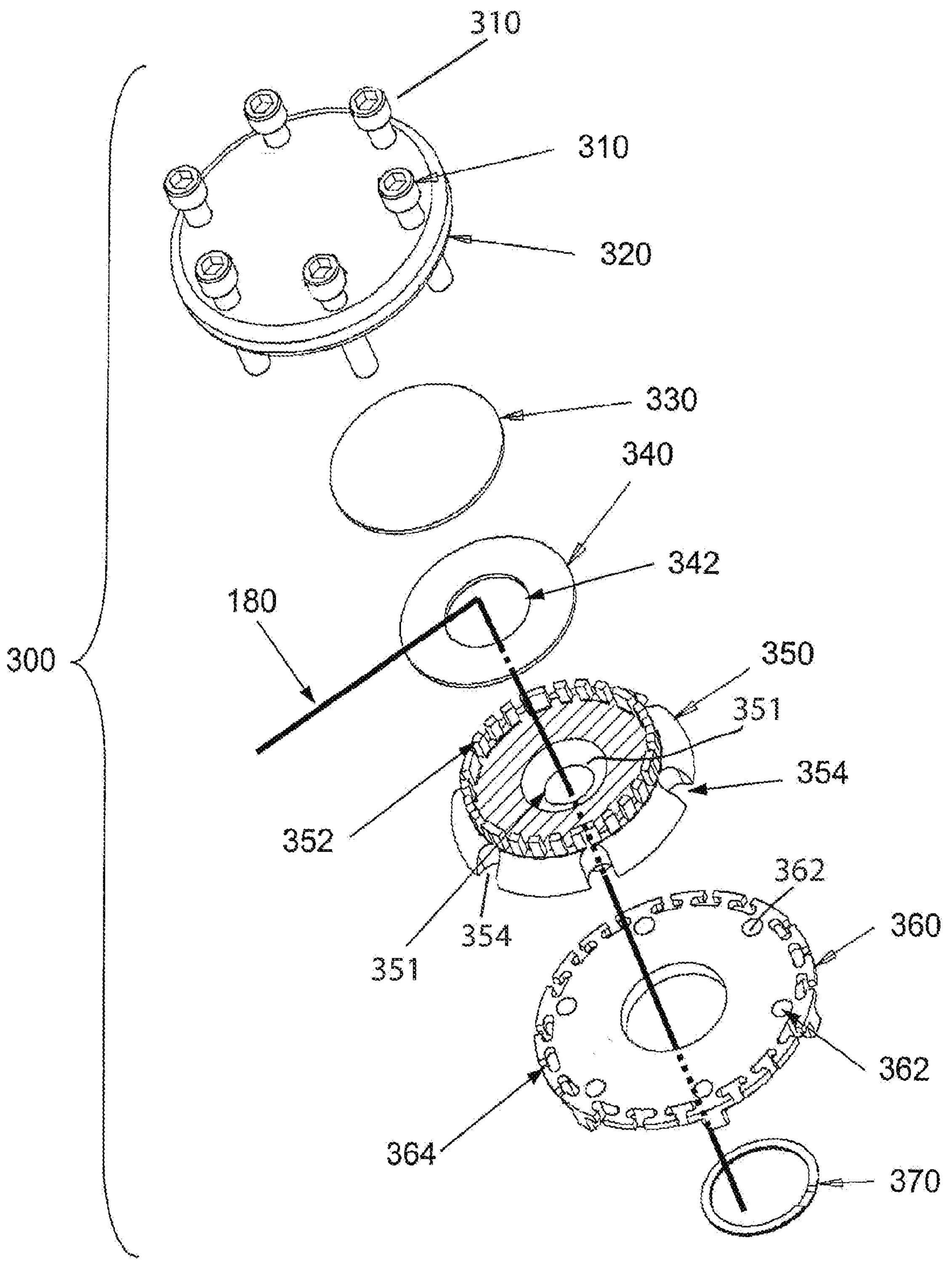
FIG. 3 shows another embodiment of a sensor feed through assembly.
Figure 5:
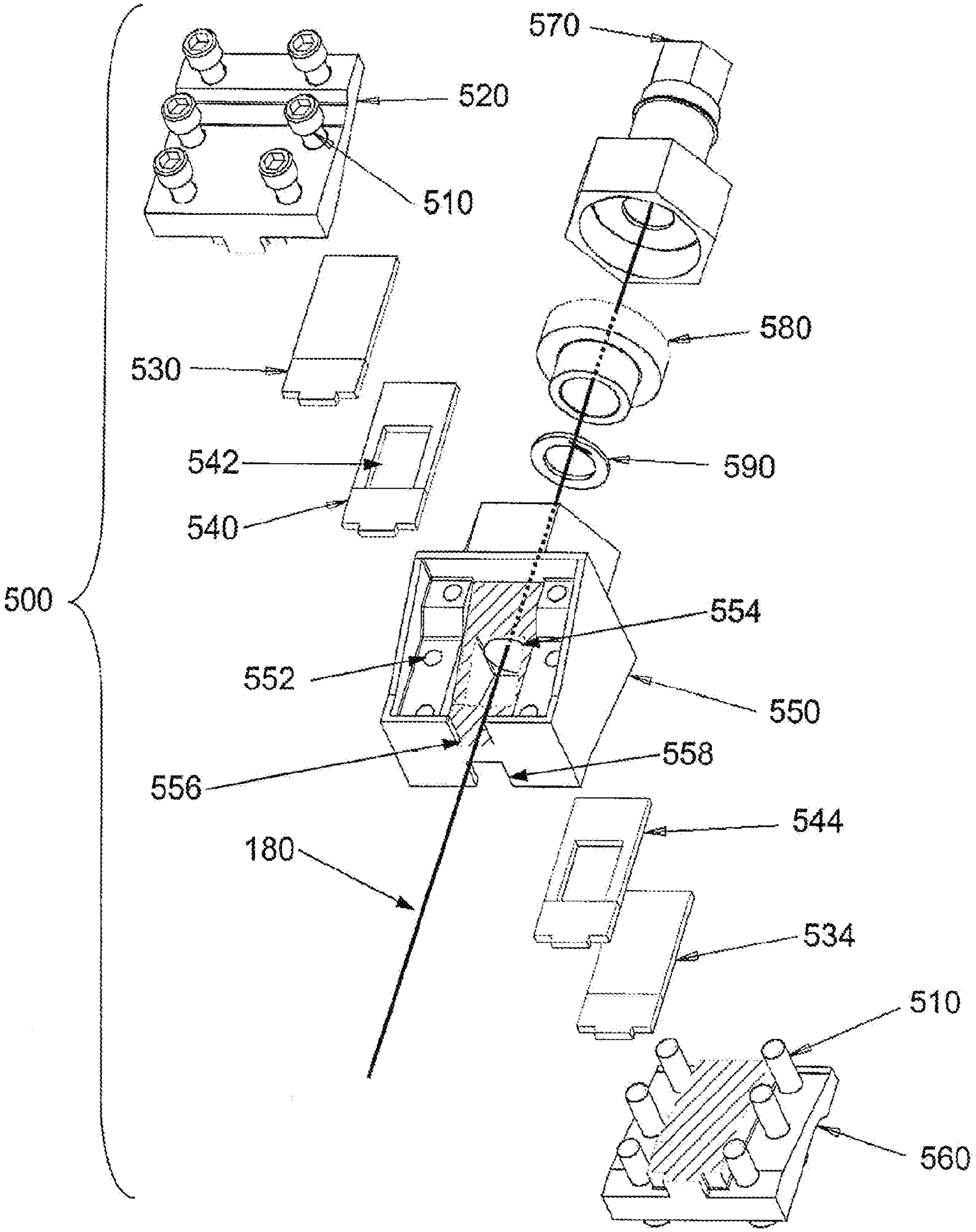
FIG. 5 shows yet another embodiment of a sensor feed through assembly.

Referring to the drawings to illustrated preferred embodiments, but not for the purpose of limiting the invention, FIG. 1 illustrates an embodiment of a feed through assembly 100 comprises a cover 110, a first seal 140, a second seal 130, a body 150 and a wire 180. The body receives the wire through an opening on the body. The wire then threads through a first seal to a series of grooves on the body. Then a cover pressures the second seal to the first seal to form a sensor feed through assembly to accommodate the wire. FIGS. 3 and 5 also show other preferred embodiments of the assembly with different configuration of the body and/or seals.

Body 150, as shown in FIG. 1, generally comprises body opening 151 and a series of grooves 152. Generally, the body is a cylindrical although it can be other shapes such as the ones shown in FIGS. 3 and 5. The body preferably is at least 0.5 inches in height and 0.5 inches in diameter. However it is contemplated that the dimension of the body can be as small and large as it needs to be. The body is generally made of any high strength material, such as alloy steel, preferably that are corrosion, pressure, and temperature resistant for operation in extreme environments. However, other material such as nickel based alloy, engineered composites and engineered plastics is contemplated. Preferably the body is plated, more preferably nickel plated to withstand corrosion in extreme environments. However, plating may or may not be necessary. The body has a coupling mechanism (not shown) to a retaining ring or a flange for assembly. Furthermore, the body can have a series of tightener groove 354 as shown in FIG. 3 to receive tighteners 310 from cover 320 that serve to hold body 350 in place relative to flange 360.

Body opening 151 is preferably located in the center of the body but can be located anywhere on the body as long as it serves to receive wires 180 and accommodate a seal ring. Preferably, the body opening accommodates a variety of threading connections, including a 0.25", 0.5", 0.75", 1.0", 1.25", 1.5", 1.75" and 2.0" National Pipe Inlet (NPT), as well as National Coarse (NC), National Fine (NC), common in the United States. Additionally, connections styles are also contemplated with welding connections and flange connections. Preferably, the body opening can be adjusted to accommodate as little as one wire to as many as 200 wires. It is contemplated that depending on the dimension, the body opening can accommodate even larger number of wires.

A series of groove 152 are located around body opening 151. While groove 152 preferably is 0.25"×0.3", it can be as small as 0.045"×0.045", or can be much larger depending on the dimension of the wires. Each groove can accommodate a number of wires, preferably at least 1, more preferably at least 3, and most preferably at least 6. It follows that the larger the groove is, the more wires the groove can accommodate.

Groove 152 shown in FIG. 1 is of a slot with raised lateral walls. The slots are evenly spaced around the perimeter of the body. However, the groove can also be formed and shaped as other recess, slot, opening or inlet of the body opening. The groove preferably is raised from the body and can also be even with the body. Thus, it is contemplated that the groove can be any suitable shape, design, and orientation for guiding wires. Preferably, the grooves are identical to one another, but they can be uniquely shaped to accommodate particular types and sizes of wires. While preferably the grooves are located around the perimeter of the body, it is contemplated they can be located anywhere on the body as long as it accommodates the threading of the wires.

First seal 140 comprises seal opening 141 which overlaps body opening 151. Preferably the entire first seal 140 overlaps with the interior portion of the body. Body 150 can have a specific indented area on its surface to receive first seal 140 as shown in FIG. 1. It is also contemplated that the entire surface area of the body can accommodate the first seal as shown in FIG. 3, where first seal 340 sits on body 350.

Figure 2:
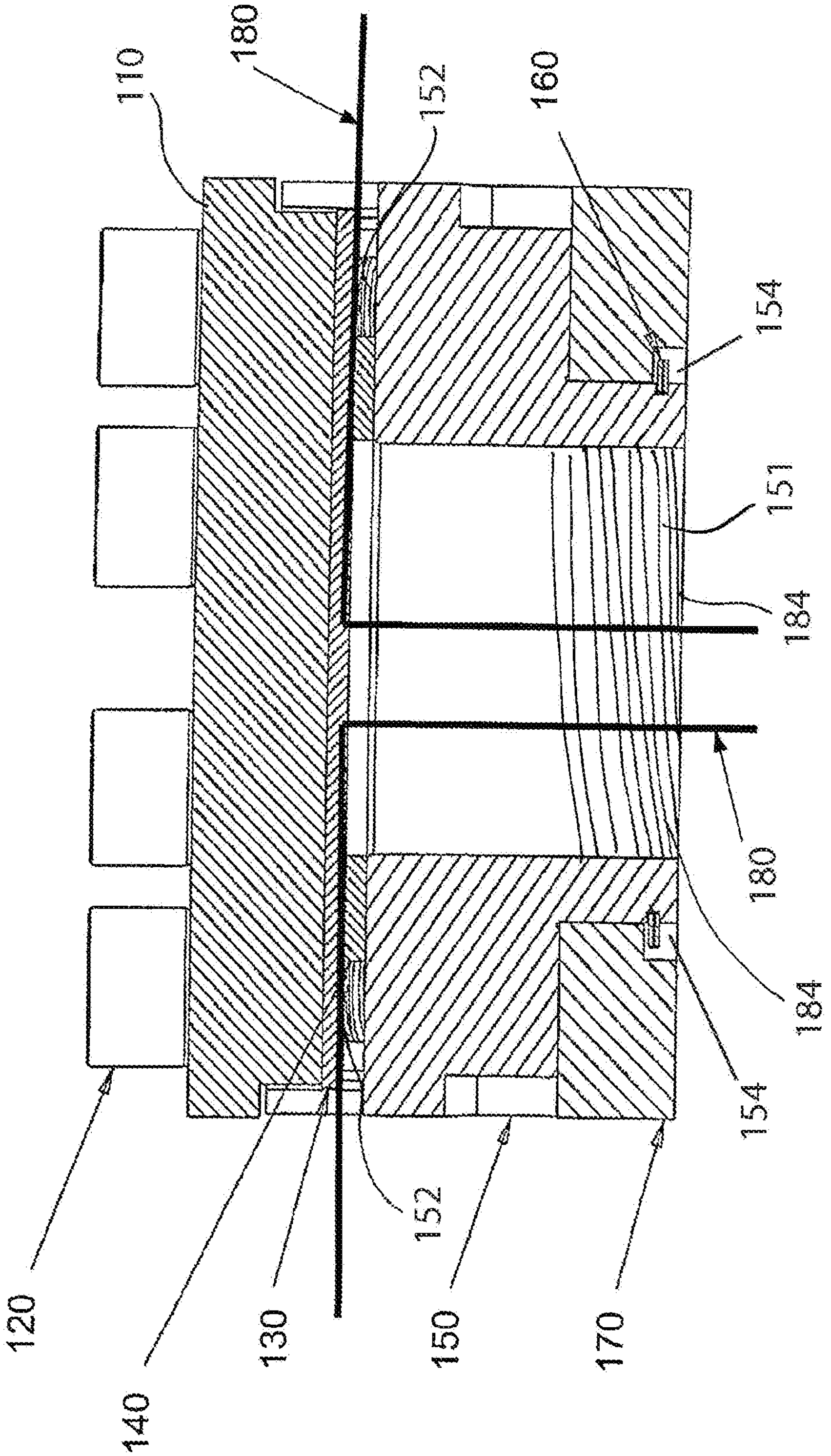
FIG. 2 is a cross-sectional view of FIG. 1.
Figure 4:
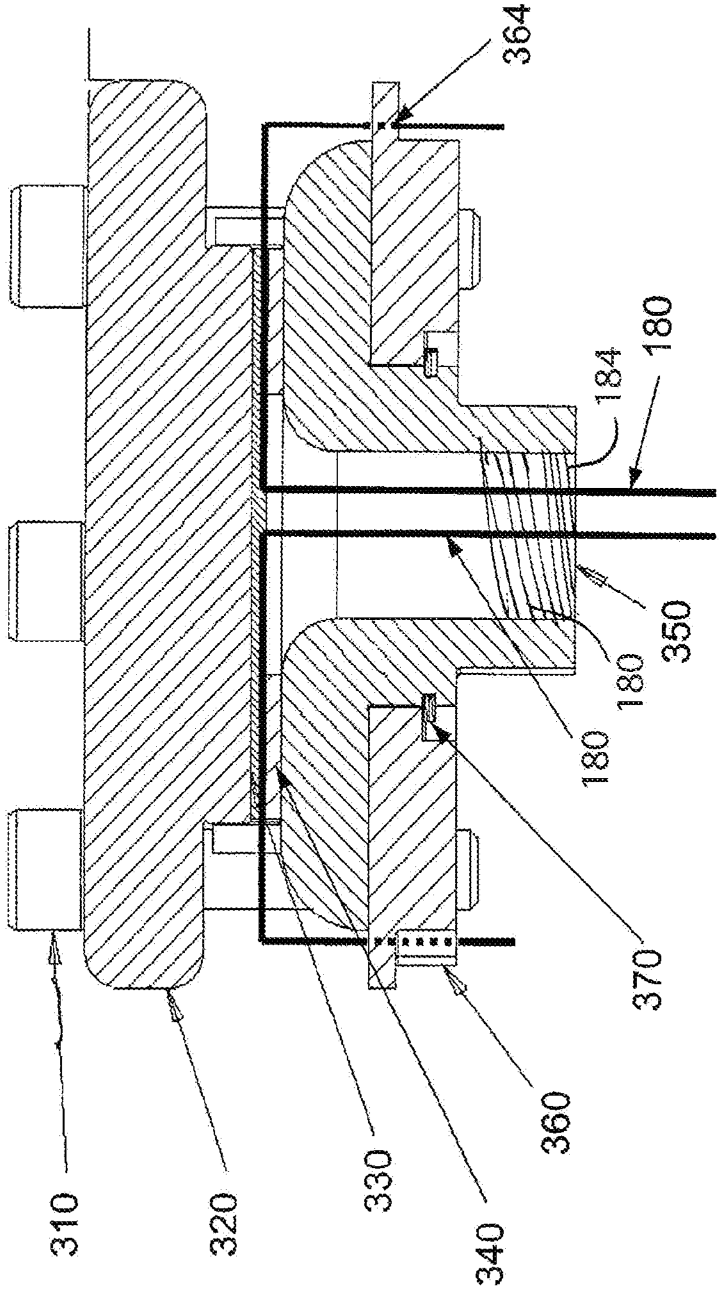
FIG. 4 is a cross-sectional view of FIG. 3.
Figure 6:
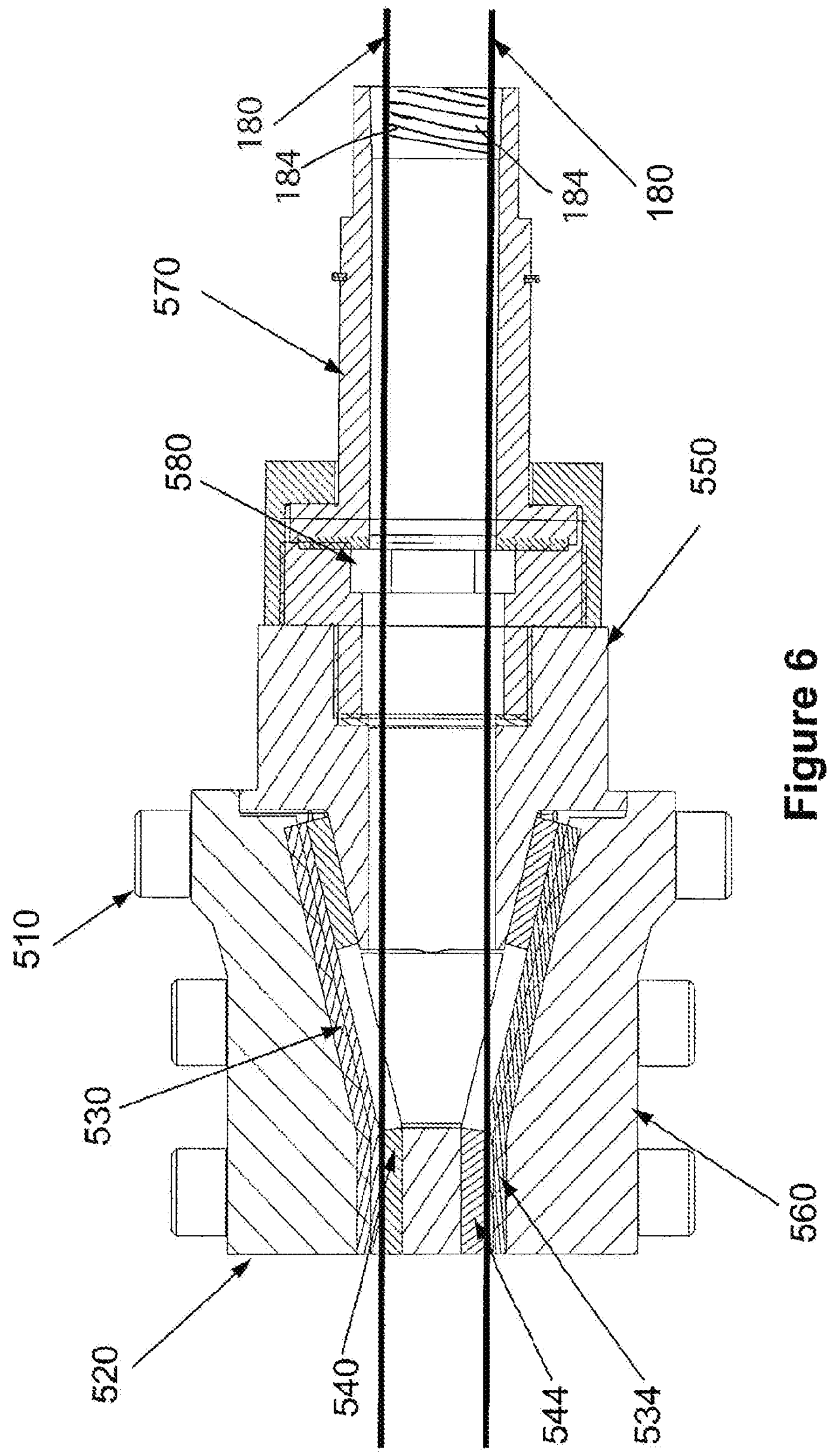
FIG. 6 is a cross-sectional view of FIG. 5.

A series of wires 180 are received from body opening 151 and pulled through the seal opening 141 as the first seal 140 firmly sits inside body 150. Thus, the sealing opening preferably has a diameter corresponding to the body opening, but it is not necessary, as long as the sealing opening is large enough to pull through wires from the body opening. As shown in FIGS. 2, 4, and 6, threaded wires 184 are threaded and stored in the body opening. Once the wires are threaded through both the body opening and the seal opening, they are threaded onto the grooves on the body. The wires can be threaded in any orientation through any grooves. In preferred embodiments, it is also contemplated that the body can guided the wires without any grooves on the body. The wires will exit between the first seal and the second seal without being threaded to any grooves.

The wire can be any wire used in machinery. Some examples are a sensor wire, pilot tubes, thermo couple, pressure tubing, or even a data wire. Preferably, the wires are 0.005" in diameter, more preferably 0.01 in diameter, even more preferably 0.1 in diameter. However, it is contemplated that depending on the application, the assembly can accommodate wires with various diameters.

Second seal 130 is positioned over first seal 140 into body 150. Unlike the first seal, the second seal preferably does not have any openings to receive the wires. Instead of pulling the wires through, the second seal serves as a cap to cover the wires that are thread through the first seal and the grooves. Thus, the first seal and the second seal compress around the wires and substantially conform to the shape of wires to form an airtight seal without crushing the wires to failure. In essence, the first seal and second seal sandwiches the wires to create a tight seal. It is appreciated that the second seal can have a series of optional tightener hole 132 have along its perimeter to receive bolts and nuts from a cap cover to fasten the assembly together. However, the tightener holes are not necessary since the second seal can be fitted in between the body and the cap. The diameter of the second seal can vary accordingly and preferably is the same as the body.

The wires then exit the assembly through between the first seal and the second seal. The wires exiting preferably is in an orthogonally direction. However, the wires can exit parallely or even laterally between the first seal and the second seal.

The first and second seals can be any gaskets. It s contemplated that while any fairly soft and resilient material can be used, first seal 140 and second seal 130 are preferably made of flexible graphite, silicone rubber, felt metal, natural rubber, man-made rubber or resilient plastic. The seals are preferably made of the same material, so as to have similar resiliency. It is appreciated that the thickness of the seals varies according to the application.

Cover 110 covers and compresses wire 180 by engaging tighteners 120 through holes 132 of second seal 130 and then through body holes 153 on body 150. The compression from cover 110 and tighteners 120 secured the wires between body 150 and first seal 140 and second seat 130 but leaves grooves 152 exposed and thus allows wire 180 to extend laterally from grooves 152. This not only protect the wires by forming an airtight seal but arrange them in an orderly fashion. The tighteners can be easily installed to take the cover on and off.

Preferably, cover 110 has at least a series of tighteners 120, more preferably six tightener; however, depending on the size of the assembly more or less may be necessary. It is also appreciated that a cover can have just one tightener. While it is preferred to have the tighteners located around the perimeter of the cover, the tighteners can be located anywhere on the cover. Thus, the number, size, and orientation of the tighteners can vary to accommodate the cover and the body. The tighteners preferably is a Grade 8 bolt, but can be any bolt, wing nut, latch, clip or any other conventional fasteners that tightens the assembly.

Nut plate 170 can be optionally coupled to body 150 via retaining ring 160. Preferably, nut plate 170 has nut opening 171 to receive wires 180. It is also contemplated that nut plate 170 has a series of nut holes 172 to accommodate tighteners 120. In general, nut plate forms a rim at the end of a pressure vessel, such as a pipe, when fastened to the pipe.

Retaining ring 160 can be any conventional retaining ring that serve as fasteners to axially position the body with the nut plate. While it is preferred the retaining ring to be circlip, it is contemplated that the retaining ring style can be radially assembled, wire formed snap rings, grooveless or self-locking, spiral, beveled, bowed, and interlocking. Preferably, the retaining ring has a size and dimension that corresponds to the entire feed-through assembly. Common materials of construction for retaining rings and snap rings include beryllium copper, spring steel, and stainless steel.

FIG. 2 shows a cross-sectional view of an assembled unit 100. Wires 180 extend from body opening 151 and through first seal 140 then extends laterally through grooves 152. Cover 110 then compresses wires 180 between second seal 130 and first seal 140 to form an airtight seal. Retaining ring 160 snaps into recess 154 in body 150, holding assembly 100 together before tighteners 120 are screwed in and connects to nut plate 170. It is recognized that the assembly takes very little to complete.

In one exemplary embodiment as depicted in FIG. 3 and a cross section view in FIG. 4, feed through assembly 300 comprises tighteners 310, cover 320, first seal 340, second seal 330, body 350, nut plate 360, and retaining ring 370. It is appreciated that instead of having a series of holes to accommodate the tighteners, body 350 accommodate tighteners 310 via tightener groove 354 around the side of body 350. Same with second seal 330, instead of having a series of holes, second seal 330 is instead held in place by sitting within body 350. Tightener groove 354 is shaped to receive tightener 310, and holds the body in place relative to hole 362 in nut plate 360. It is also contemplated that wire grooves 352 in body 350 do not have to be identical to one another. The sloped body opening 351 helps prevent wear and tear to wire 180 when threaded through the assembly. Lastly, nut plate 360 also comprises nut plate grooves 364. Nut plate grooves 364 can hold sets of wires in place against the outside of the assembly to prevent a wire from “flapping straight” when a user is positioning multiple wires. FIG. 4 shows the cross-sectional view of the assembled feed through assembly 300 in how wires 180 can be “folded” into the plurality of nut plate grooves 364. This allows the wires to be secured along the side of the assembly instead of laterally.

Therefore, it is appreciated that the wires can extend not only laterally from the body grooves, but also downwardly. Indeed, the wires can extend in various directions, laterally, parallely and orthogonally. The advantage of the present inventive subject matter allows the wires to be organized according to the need and application.

FIG. 5 shows yet another embodiment of a sensor feed-through assembly where the wires do not bend. Assembly 500 comprises tightener 510, cover 520, first seal 540, second seal 530, body 550, third seal 544, fourth seal 534 and cover 560.

It is recognized that instead of a cylindrical shape, body 550 is of a trapezoid shape, or wedge-shaped. The trapezoid shape allows the assembly to be fitted with a pipe. Thus, body 550 is coupled to pipe 570 via the pipe reducer 580 and pipe seal 590. Wire 180 threads through body opening 554 through pipe 570 then through first seal opening 542 and finally threads through groove 556. Preferably, a pair of groove 556 is positioned parallel to body opening 554 as two indents. Besides having first seal 540 and second seal 530 compress around wires 180, the wires are also threaded on the other side of the body through groove 558, third seal 544 and fourth seal 534. All seals are compressed around the wires with tightener 510 that go through body holes 552 into covers 520 and 560. It is also recognized that there only needs to be one cover (not shown) for the assembly to operate. The position and orientation of groove 556 allows wire 180 to thread through the assembly without substantially bending wire 180. Such a configuration is ideal for wires that cannot bend, for example fiber-optic wires or metal tubing. A cross-sectional view of assembly 500 is shown in FIG. 6, with wires 180 and 210 threaded through the seals without bending.

The application of the present subject matter can be numerous. A typical use for the feed-through assembly can be for housing sensor wires exiting high temperatures and high pressure environments. Preferably, the assembly can withstand temperatures of at least 850° F. and a pressure of at least 500 PSI. However, it should be appreciated that the feed-through assembly can accommodate a variety of high and low temperatures with high and low pressures.

The advantage of the present feed-through assembly are numerous. The simplicity and compact design of the assembly present a solution to problems relating to dangling wires in compressed environments. With the wires being secured in a feed-through unit, the effects of the outside pressure and temperatures do not disturb the sensor wires. The wires are also arranged in an organized and orderly fashion to avoid being tangled and damaged.

Another advantage is versatility since the feed-through assembly can be easily changed by adding or taking different components depending on the pressure vessel that it engages to. The unit itself can be fastened to a pressure vessel, such as a gas turbine engine for power generation, using a standard threaded connection. Thus, it is appreciated that the feed-through unit can have various components customized to couple different vessels that accommodate various number, size and type of wires. The application can be limitless.

Furthermore, the feed-through assembly affords protection to the wires. The simplicity of threading multiple wires and pulled through the assembly, protect the wires and make it easy for installation and removal of the end-fittings. Since there are no threads or sharp edges, the wires are protected. The special characteristics of the assembly also provide for ultra-low leakage sealing. The preferred embodiment of the assembly had shown to have almost minimum leak rate under pressure of 1000 PSI and more. To that end, the seals of the feed-through unit can be easily replaced without disconnecting the wires. Setup is then quick and easy. The separate components of a typical feed-through assembly can be put together quickly and easily, oftentimes in less than 15 minutes.

Thus, it is contemplated that a kit can be manufactured, marketed, advertised and sold to include the various components of the feed-through assembly. Instructions can also be part of the kit to show how to assemble the feed-through unit. It is also contemplated that various components, such as the seals, are sold separately so a user can easily replace the seals when needed.

It should be apparent to those skilled in the art that many more modifications besides those already described are possible without departing from the inventive concepts herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps could be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A sensor feed through assembly comprising:

a body having a first body opening configured to accommodate a first plurality of wires and a first groove configured to accommodate the first plurality of wires, wherein the first groove is positioned parallel to the first opening such that the first plurality of wires do not bend when passing through the first opening and first groove;

a first seal configured to couple with the body and having a first seal opening;

a second seal configured to couple with the first seal to form a first sealing surface, wherein a first portion of the first sealing surface is disposed in a manner that is substantially parallel to a length of the first plurality of wires when passing from the first body opening to the first groove, and a second portion of the first sealing surface is disposed in a manner that is substantially non-parallel to the length of the first plurality of wires;

a first cover configured to couple with the body such that the first and second seals are pressed together to form a tight seal around the first plurality of wires.

2. The sensor feed through assembly of claim 1, further comprising:

a second groove configured to accommodate the second plurality of wires, wherein the second groove is positioned parallel to the first opening such that the second plurality of wires do not bend when passing through the first opening and second groove;

a third seal configured to couple with the body and having a second seal opening;

a fourth seal configured to couple with the third seal to form a second sealing surface, wherein a first portion of the second sealing surface is disposed in a manner that is substantially parallel to a length of the second plurality of wires when passing from the first body opening to the second groove, and a second portion of the second sealing surface is disposed in a manner that is substantially non-parralel to the length of the second plurality of wires;

a second cover configured to couple with the body such that the third and fourth seals are pressed together to form a tight seal around the second plurality of wires.

3. The sensor feed through assembly of claim 2, wherein the body further comprises a receiving portion configured to couple to a pipe.

4. The sensor feed through assembly of claim 3, wherein the receiving portion is configured to couple with the pipe such that the length of the pipe is substantially parallel to the length of the first and second plurality of wires when passing from the first body opening to the first and second grooves.

5. The sensor feed through assembly of claim 2, further comprising a pipe adapter configured to couple the pipe to the receiving portion.

6. The sensor feed through assembly of claim 5, wherein the pipe adapter includes a pipe reducer and a pipe seal.

7. The sensor feed through assembly of claim 2, further comprising a first tightener and a second tightener configured to couple first and second covers to the body, respectively, such that the first seal is pressed against the second seal and the third seal is pressed against the fourth seal.

8. The sensor feed through assembly of claim 2, wherein first and second sealing surfaces are parallel to one another and separated by a distance that is smaller than the first body opening.

9. The sensor feed through assembly of claim 2, wherein the first, second, third, and fourth seals have a non-linear length.

10. The sensor feed through assembly of claim 2, wherein the first portion of the first and second sealing surfaces are at an angle of at 15 degrees relative to the second portion of the first and second sealing surfaces.

11. The sensor feed through assembly of claim 1, wherein the body is wedge-shaped.

* * * * *